(12) United States Patent
Kyu et al.

(10) Patent No.: US 10,731,635 B2
(45) Date of Patent: Aug. 4, 2020

(54) POLYMER ELECTROLYTE MEMBRANE ASSEMBLY

(71) Applicants: Thein Kyu, Akron, OH (US); Camilo Rendon Piedrahita, Akron, OH (US); Jinwei Cao, Akron, OH (US)

(72) Inventors: Thein Kyu, Akron, OH (US); Camilo Rendon Piedrahita, Akron, OH (US); Jinwei Cao, Akron, OH (US)

(73) Assignee: The University of Akron, Akron, OH (US)

( * ) Notice: Subject to any disclaimer, the term of this patent is extended or adjusted under 35 U.S.C. 154(b) by 204 days.

(21) Appl. No.: 15/982,185

(22) Filed: May 17, 2018

(65) Prior Publication Data

US 2018/0337417 A1 Nov. 22, 2018

Related U.S. Application Data

(60) Provisional application No. 62/507,378, filed on May 17, 2017, provisional application No. 62/557,394, filed on Sep. 12, 2017.

(51) Int. Cl.
| | |
|---|---|
| *H01M 4/86* | (2006.01) |
| *F03G 7/00* | (2006.01) |
| *H01M 8/1018* | (2016.01) |
| *B60C 19/00* | (2006.01) |
| *B60C 5/14* | (2006.01) |

(52) U.S. Cl.
CPC .......... *F03G 7/005* (2013.01); *H01M 4/8668* (2013.01); *H01M 4/8673* (2013.01); *B60C 19/00* (2013.01); *B60C 2005/145* (2013.01); *H01M 2008/1095* (2013.01); *H01M 2300/0082* (2013.01)

(58) Field of Classification Search
CPC ............ H01M 8/1253; H01M 4/8668; H01M 4/8673; H01M 8/1004; H01M 8/1027; H01M 2008/1095; H01M 2300/0082; F03G 7/005; B60C 2005/145; B60C 19/00
See application file for complete search history.

(56) References Cited

U.S. PATENT DOCUMENTS

| | | |
|---|---|---|
| 6,725,713 B2 | 4/2004 | Adamson et al. |
| 7,138,911 B2 | 11/2006 | Tyndall |

(Continued)

OTHER PUBLICATIONS

Echeverri et al; "Highly conductive, completely amorphous polymer electrolyte membranes fabricated through photo-polymerization of poly(ethylene glycol diacrylate) in mixtures of solid plasticizer and lithium salt"; Solid State Ionics; 254; (2014); 92-100.

(Continued)

*Primary Examiner* — Lisa S Park
(74) *Attorney, Agent, or Firm* — Renner Kenner Greive Bobak Taylor & Weber (57) ABSTRACT

A polymer electrolyte membrane assembly includes a polymer electrolyte membrane layer positioned between a first electrode and a second electrode. The polymer electrolyte membrane layer can be made from a composition including a polymer matrix, a plasticizer, and an ionic material. The polymer electrolyte membrane assembly may be utilized to harvest electrical energy by allowing the polymer electrolyte membrane assembly to bend to thereby produce a second ion concentration gradient different from an initial ion concentration gradient.

18 Claims, 2 Drawing Sheets

(56) References Cited

U.S. PATENT DOCUMENTS

| | | | |
|---|---|---|---|
| 9,024,510 B1 | 5/2015 | Chen | |
| 9,548,514 B2 | 1/2017 | Kyu et al. | |
| 2004/0164558 A1* | 8/2004 | Adamson | B60C 11/00 |
| | | | 290/1 R |
| 2005/0019668 A1* | 1/2005 | Yamamoto | C08J 5/2231 |
| | | | 429/317 |
| 2013/0095378 A1* | 4/2013 | Machida | H01M 10/056 |
| | | | 429/188 |
| 2013/0249348 A1* | 9/2013 | Chiang | F03G 7/005 |
| | | | 310/300 |
| 2014/0049227 A1* | 2/2014 | Martin | H01M 10/0525 |
| | | | 320/162 |
| 2014/0255772 A1* | 9/2014 | Kyu | H01M 10/052 |
| | | | 429/189 |

OTHER PUBLICATIONS

He et al.; "Highly conductive solvent-free polymer electrolyte membrane for lithium-ion batteries: Effect of prepolymer molecular weight"; Journal of Membrane Science; 498; (2016); 208-217.

* cited by examiner

POLYMER ELECTROLYTE MEMBRANE ASSEMBLY

CROSS-REFERENCE TO RELATED APPLICATIONS

The present application claims the benefit of U.S. Provisional Patent Application No. 62/507,378, filed May 17, 2017, and U.S. Provisional Patent Application No. 62/557,394, filed Sep. 12, 2017, which are each incorporated herein by reference.

STATEMENT REGARDING FEDERALLY SPONSORED RESEARCH OR DEVELOPMENT

This invention was made with government support under DMR 1502543 awarded by NSF. The government has certain rights in the invention.

FIELD OF THE INVENTION

The present invention relates to polymer electrolyte membrane assemblies. The polymer electrolyte membrane assemblies may be utilized for sensing, actuation, and energy harvesting. The polymer electrolyte membrane assemblies can convert mechanical input to electric signals, and can convert electrical signals to mechanical output.

BACKGROUND OF THE INVENTION

Due to pollution caused by fossil fuels, researchers have been seeking ways to harvest energy from green and clean resources. Such energy-harvesting devices include solar cells and hydrogen fuel cells, which harvest energy from various resources and convert the harvested energy into electrical energy.

Moreover, with the recent development of wearable devices and robotics, it is desired that sensors and actuators offer more flexibility. For instance, wearable robotic systems need flexible pressure and temperature sensors to act like artificial skin, and soft actuators to act like artificial muscles. In the human body, skin senses and transmits signals through the nervous system by changing the ion polarity across the cell membranes. Also, muscles can contract based on the sudden change of ion concentration gradient across the cell membrane.

Some piezoelectric materials are known that are capable of generating electrical signals when deformed (that is, pressed or stretched). Examples include some ceramic materials (e.g. lead zirconate titanate (PZT)) and some polymers (e.g. PVDF). Certain other known materials that exhibit the equivalent property when bending or flexing are called flexoelectric materials. An exemplary known flexoelectric material is bent-core liquid crystal elastomers.

One disadvantage of these ceramic materials lies in their difficult synthesis procedures, since they require extreme synthesis conditions, such as high pressure and temperatures. Another drawback is the use of heavy toxic metals for their fabrication. These materials also may need to be embedded when in use, since their weight and rigidity might alter their position during operation.

For PVDF based materials, the manufacturing process is generally tedious and costly. For example, mechanical stretching while applying a high electrical field may be necessary to produce these materials.

Bent-core liquid crystals are special liquid crystals elastomer embedded in elastomer matrices. When deformed, these liquid crystals misalign their dipoles and produce electrical signal when released. These materials possess very low flexoelectric coefficient, and are also difficult to synthesize.

SUMMARY OF THE INVENTION

In a first embodiment, the present invention provides a composition for a polymer electrolyte membrane comprising a polymer matrix, a plasticizer, and an ionic material.

In a second embodiment, the present invention provides a composition as in any of the above embodiments, wherein the composition forms a polymer electrolyte membrane layer positioned between a first electrode and a second electrode to thereby form a polymer electrolyte membrane assembly.

In a third embodiment, the present invention provides a composition as in any of the above embodiments, wherein the ionic material is selected from the group consisting of salt and ionic liquid.

In a fourth embodiment, the present invention provides a polymer electrolyte membrane assembly as in any of the above embodiments, wherein the polymer matrix is selected from the group consisting of thiosiloxanes, polysiloxanes, polydimethylsiloxane, poly(ethylene glycol) poly(ethylene glycol) diacrylate, poly(ethylene glycol) dimethylacrylate, poly(ethylene glycol) diamine, polyethylene glycol bis-carbamate, poly(acrylic acid), polyethylenimine, polyacrylonitrile, carboxyl terminated butadiene-acrylonitrile, polyurethanes, sulfonated polyisoprene, polycarbamates, polycarbonates, zwitterionic polymers, and combinations thereof.

In a fifth embodiment, the present invention provides a polymer electrolyte membrane assembly as in any of the above embodiments, wherein the plasticizer is selected from the group consisting of dinitriles, succinonitrile, glutaronitrile, adiponitrile, octyl-2-cyanoacrylate, propylene carbonate, ethylene carbonate, 1,2-butylene carbonate, dimethyl carbonate, tetraethylene glycol dimethyl ether, poly(ethylene glycol), and combinations thereof.

In a sixth embodiment, the present invention provides a polymer electrolyte membrane assembly as in any of the above embodiments, wherein the ionic material includes both cations and anions.

In a seventh embodiment, the present invention provides a polymer electrolyte membrane assembly as in any of the above embodiments, wherein the ionic material includes cations selected from the group consisting of lithium ion, sodium ion, potassium ion, calcium ion, magnesium ion, aluminum ion, iron ion, zirconium ion, imidazolium ions, 1-ethyl-3-methylimidazolium ion, 1-butyl-3-methylimidazolium ion, 1-allyl-3-methylimidazolium ion, 1-butyl-2,3-dimethylimidazolium ion, 1-decyl-3-methylimidazolium ion, 1-hexyl-2,3-dimethylimidazolium ion, 1-hexyl-3-methylimidazolium ion, 1-(2-hydroxyethyl)-3-methylimidazolium ion, 2,3-dimethyl-1-propylimidazolium ion, 1,3-dimethylimidazolium ion, 1-methyl-3-n-octylimidazolium ion, 1-methyl-3-propylimidazolium ion, 1-methyl-3-pentylimidazolium ion), ammonium ions, amyltriethylammonium ion, butyltrimethylammonium ion, ethyl(2-methoxyethyl) dimethylammonium ion, tetrabutylammonium ion), pyridinium ions, 1-butylpyridinium ion, 1-butyl-4-methylpyridinium ion), pyrrolidinium ions (1-butyl-1-methylpyrrolidinium ions, 1-ethyl-1-methylpyrrolidinium ions, 1-methyl-1-propylpyrrolidinium ions), phosphonium ions, and combinations thereof.

In an eighth embodiment, the present invention provides a polymer electrolyte membrane assembly as in any of the above embodiments, wherein the ionic material includes anions selected from the group consisting of chloride ion, bromide ion, hexafluoroarsenic ion, hexafluorophosphate ion ($PF_6^-$), tetrafluoroborate ion, perchlorate ion, trifluoromethanesulfonic ion ($[CF_3SO_3]^-$), $[N(C_2F_5SO_2)_2]^-$, $[N(C_4F_9SO_2)(CF_3SO_2)]^-$, bis(trifluoromethane)sulfonimide ion ($[N(CF_3SO_2)_2]^-$), bis(oxalato)borate ion ($[B(CO_2)]^-$), tetrafluoroborate ion ($BF_4^-$), bis(fluorosulfonyl)imide ion ($[N(FSO_2)_2]^-$), nitrate ion, hydrogen sulfate ion, $Al_2O_7^-$, $Al_3Cl_{10}^-$, $AlCl_4^-$, trifluoroacetate ion, trifluoro(trifluoromethyl)borate ion, thiocyanate ion, dimethyl phosphate ion, and combinations thereof.

In a ninth embodiment, the present invention provides a polymer electrolyte membrane assembly as in any of the above embodiments, wherein the first electrode and the second electrode each comprise an electron-conductive material and a binder material.

In a tenth embodiment, the present invention provides a polymer electrolyte membrane assembly as in any of the above embodiments, wherein the electron-conductive material is selected from the group consisting of carbon black, single-walled carbon nanotubes, multi-walled carbon nanotubes, mesoporous carbon, activated carbon, graphene, polyanilines, poly(pyrrole)s, poly(3,4-ethylenedioxythiophene), poly(p-phenylene sulfide), and combinations thereof.

In an eleventh embodiment, the present invention provides a polymer electrolyte membrane assembly as in any of the above embodiments, wherein the binder material is selected from the group consisting of polyvinylidene fluoride (PVDF), polyvinylidene fluoride-trifluoroethylene (PVDF-TrFE), carboxylic methyl cellulose (CMC), thiosiloxanes, polysiloxanes, poly(ethylene glycol) diacrylate, poly(ethylene glycol), poly(ethylene glycol) dimethylacrylate, poly(acrylic acid), polyethylenimine, polyacrylonitrile, carboxyl terminated butadiene-acrylonitrile, polyurethanes, sulfonated polyisoprene, polycarbamates, polycarbonates, zwitterionic polymers, and combinations thereof.

In a twelfth embodiment, the present invention provides a polymer electrolyte membrane assembly as in any of the above embodiments, wherein the composition further comprises filler.

In a thirteenth embodiment, the present invention provides a polymer electrolyte membrane assembly as in any of the above embodiments, wherein the filler is selected from the group consisting of silicon oxide, titanium oxide, aluminum oxide, tin oxide, zinc oxide, zirconium oxide, lead zirconate titanate, barium titanate, polyhedral oligomeric silsesquioxane, and combinations thereof.

In a fourteenth embodiment, the present invention provides a polymer electrolyte membrane assembly as in any of the above embodiments, wherein the polymer matrix is poly(ethylene glycol) diacrylate and wherein the plasticizer is succinonitrile.

In a fifteenth embodiment, the present invention provides a polymer electrolyte membrane assembly as in any of the above embodiments, wherein the polymer electrolyte membrane assembly forms a composite layer of a pneumatic tire.

In a sixteenth embodiment, the present invention provides a polymer electrolyte membrane assembly as in any of the above embodiments, wherein the polymer electrolyte membrane assembly is adapted to harvest electrical energy upon the polymer electrolyte membrane assembly bending when contacted with a flow of air provided by wind.

In a seventeenth embodiment, the present invention provides a method of harvesting electrical energy, comprising steps of providing a polymer electrolyte membrane assembly as in any of the above embodiments coupled with an energy storage device, wherein the polymer electrolyte membrane assembly includes a polymer electrolyte membrane layer positioned between a first electrode and a second electrode, wherein the polymer electrolyte membrane is made from a polymer matrix, a plasticizer, and an ionic material, wherein the first electrode and the second electrode are each made from a conductive material and a binder material, wherein the polymer electrolyte membrane assembly has an open circuit voltage having an initial ion concentration gradient, allowing the polymer electrolyte membrane assembly to bend to thereby produce a second ion concentration gradient different from the initial ion concentration gradient, and collecting, with the energy storage device, electrical energy formed by the second ion concentration gradient.

In an eighteenth embodiment, the present invention provides a method as in any of the above embodiments, wherein the energy storage device is a battery, which performs said step of collecting.

In a nineteenth embodiment, the present invention provides a method of electrical actuation, comprising steps of providing a polymer electrolyte membrane assembly as in any of the above embodiments coupled with an electrical energy source, wherein the polymer electrolyte membrane assembly includes a polymer electrolyte membrane layer positioned between a first electrode and a second electrode, wherein the polymer electrolyte membrane is made from a polymer matrix, a plasticizer, and an ionic material, wherein the first electrode and the second electrode are each made from a conductive material and a binder material, wherein the polymer electrolyte membrane assembly has an open circuit voltage having an initial ion concentration gradient, and applying, with the electrical energy source, electrical energy to the polymer electrolyte membrane assembly such that the polymer electrolyte membrane assembly changes to a second ion concentration gradient to thereby act as an electrical actuator.

In a twentieth embodiment, the present invention provides a method as in any of the above embodiments, wherein the electrical energy source is a DC voltage supplier, which performs said step of applying.

BRIEF DESCRIPTION OF THE DRAWINGS

Advantages of the present invention will become better understood with regard to the following description, appended claims, and accompanying drawings wherein:

DETAILED DESCRIPTION OF ILLUSTRATIVE EMBODIMENTS

Embodiments of the invention are based, at least in part, on compositions useful as a polymer electrolyte membrane. The polymer electrolyte membrane compositions include polymeric material (which may also be referred to as polymer matrix) and ionic material, which may be salt or ionic liquid. In one or more embodiments, the polymer electrolyte membrane compositions further include plasticizer. In one or more embodiments, the polymer electrolyte membrane compositions further include filler. The polymer electrolyte membrane compositions maintain flexibility upon solidification and therefore may be useful for a polymer electrolyte membrane assembly that can convert applied mechanical deformation into electrical signal, and can convert applied electrical signal into mechanical deformation. The polymer electrolyte membrane assembly further includes a flexible electrode positioned on each side of the polymer electrolyte membrane. The polymer electrolyte membrane assembly has flexoelectric and piezoelectric properties and therefore an ion concentration gradient is produced within the polymer electrolyte membrane when the polymer electrolyte membrane is bent. This ion concentration gradient generates electrical potential difference between the two flexible electrode layers. An energy storage device, such as a battery, can be coupled with the polymer electrolyte membrane assembly to collect and store the generated electrical energy.

Figure 1:
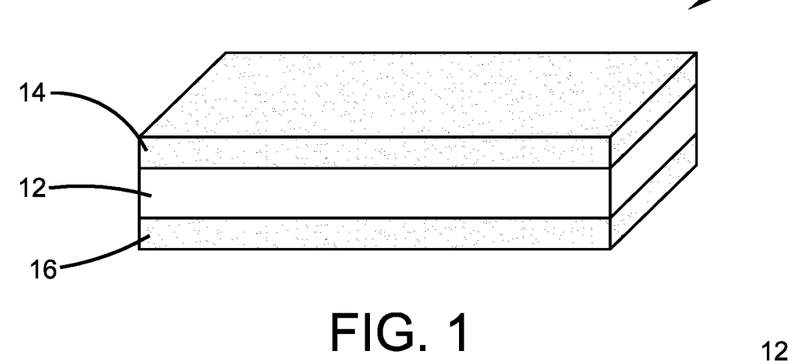
FIG. 1 is a schematic of a polymer electrolyte membrane assembly.
Figure 2:
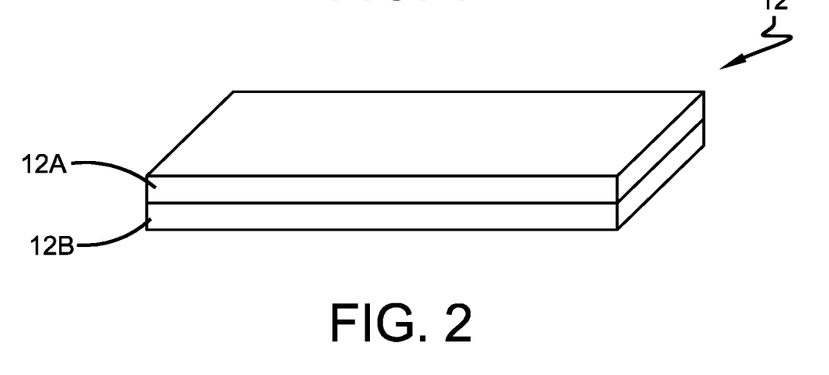
FIG. 2 is a schematic of a polymer electrolyte membrane having more than one layer.

With reference to FIG. 1, a polymer electrolyte membrane assembly, generally represented by the numeral 10, includes a polymer electrolyte membrane layer 12 positioned between a first flexible electrode layer 14 and a second flexible electrode layer 16. This may be described as polymer electrolyte membrane layer 12 being sandwiched in between first flexible electrode layer 14 and second flexible electrode layer 16. As shown in FIG. 1, in one or more embodiments, polymer electrolyte membrane layer 12 may be made from a single layer. In other embodiments, polymer electrolyte membrane layer 12 may be made from a plurality of layers. With reference to FIG. 2, in one or more embodiments, polymer electrolyte membrane layer 12 may be made from a first polymer electrolyte membrane layer 12A and a second polymer electrolyte membrane layer 12B. Any suitable number of polymer electrolyte membrane layers may be utilized.

Though not shown in the figures, it should be appreciates that polymer electrolyte membrane assembly 10 may be coupled with a suitable apparatus, such as a support assembly, for holding polymer electrolyte membrane assembly 10 in a desired location. Suitable apparatuses for this function are generally known to those skilled in the art.

Polymer electrolyte membrane layer 12, which may also be described as piezo-flexoelectric material 12, may be made from any suitable polymer-based composition that provides suitable flexibility and ion conductivity. The composition, prior to forming polymer electrolyte membrane layer 12, may be described as precursor materials.

In one or more embodiments, polymer electrolyte membrane layer 12 may be characterized as an ion containing polymer membrane having a specific conductivity ($\sigma$) within the range of from about $10^{-9}$ siemens per centimeter (S/cm) to about $10^{-3}$ S/cm at room temperature. In one or more embodiments, polymer electrolyte membrane layer 12 may be characterized as an ion containing polymer membrane exhibiting ionic conductivity at the supertonic conductor level. This may be characterized as having a specific conductivity ($\sigma$) within the range from about $10^{-3}$ S/cm to about 10 S/cm at room temperature.

In one or more embodiments, polymer electrolyte membrane layer 12 is made from a composition including polymeric material and ionic material. In one or more embodiments, polymer electrolyte membrane layer 12 is made from a composition including polymeric material, plasticizer, and ionic material. In one or more embodiments, the composition may further include filler.

The polymeric material of polymer electrolyte membrane layer 12 generally serves the function of holding and conducting dissociated ions providing by the ionic material. It may therefore be described as a matrix for the ions. In one or more embodiments, the polymeric material may exhibit rubbery properties, which may be characterized as having a glass transition temperature in a range from −100° C. to −20° C. Rubbery properties may also be characterized as being very elastic and able to sustain high strain. In one or more embodiments, the polymeric material may exhibit plastic properties, which may be characterized as having a glass transition temperature above −20° C. Plastic properties may also be characterized as having higher yield strength.

Exemplary polymeric materials include siloxanes, such as thiosiloxanes and polysiloxanes (such as polydimethylsiloxane), poly(ethylene glycol) and its derivatives (such as poly(ethylene glycol) diacrylate, poly(ethylene glycol) dimethylacrylate, poly(ethylene glycol) diamine, poly(ethylene glycol) bis-carbamate), poly(acrylic acid), polyethylenimine, polyacrylonitrile, carboxyl terminated butadiene-acrylonitrile, polyurethanes, sulfonated polyisoprene, polycarbamates, polycarbonates, zwitterionic polymers, and combinations thereof. Thus, certain suitable polymeric materials may contain ether, ester, alkyl carbonates, acrylonitrile, siloxane groups, and zwitterion polymers.

The ionic material of polymer electrolyte membrane layer 12 generally serves the function of providing anions and cations such that an ion concentration gradient is produced within the polymer electrolyte membrane. Based on the presence of the ionic material, polymer electrolyte membrane layer 12 has an initial ion concentration gradient. Upon bending the polymer electrolyte membrane layer 12, the initial ion concentration gradient will change to a second ion concentration gradient different from the initial ion concentration gradient.

The ionic material includes an anion and a cation, or is capable of being dissociated to produce an anion and a cation. The ionic material may be selected from the group consisting of a salt and an ionic liquid, and combinations thereof.

Cations may be provided in the form of monovalent ions, multivalent ions, and ionic compounds. Exemplary cations that may be provided by an ionic material include lithium ion, sodium ion, potassium ion, calcium ion, magnesium ion, aluminum ion, iron ion, zirconium ion, imidazolium ions (such as 1-ethyl-3-methylimidazolium ion, 1-butyl-3-methylimidazolium ion, 1-allyl-3-methylimidazolium ion, 1-butyl-2,3-dimethylimidazolium ion, 1-decyl-3-methylimidazolium ion, 1-hexyl-2,3-dimethylimidazolium ion, 1-hexyl-3-methylimidazolium ion, 1-(2-hydroxyethyl)-3-methylimidazolium ion, 2,3-dimethyl-1-propylimidazolium ion, 1,3-dimethylimidazolium ion, 1-methyl-3-n-octylimidazolium ion, 1-methyl-3-propylimidazolium ion, 1-methyl-3-pentylimidazolium ion), ammonium ions (such as amyltriethylammonium ion, butyltrimethylammonium ion, ethyl (2-methoxyethyl)dimethylammonium ion, tetrabutylammonium ion), pyridinium ions (such as 1-butylpyridinium ion, 1-butyl-4-methylpyridinium ion), pyrrolidinium ions (1-butyl-1-methylpyrrolidinium ions, 1-ethyl-1-methylpyrrolidinium ions, 1-methyl-1-propylpyrrolidinium ions), phosphonium ions, and combinations thereof.

Anions may be provided in the form of monovalent ions, multivalent ions, and ionic compounds. Exemplary anions that may be provided by an ionic material include chloride ion, bromide ion, hexafluoroarsenic ion, hexafluorophosphate ion ($PF_6^-$), tetrafluoroborate ion, perchlorate ion, trifluoromethanesulfonic ion ($[CF_3SO_3]^-$), $[N(C_2F_5SO_2)_2]^-$, $[N(C_4F_9SO_2)(CF_3SO_2)]^-$, bis(trifluoromethane)sulfonimide ion ($[N(CF_3SO_2)_2]^-$), bis(oxalato)borate ion ($[B(CO_2)]^-$), tetrafluoroborate ion ($BF_4^-$), bis(fluorosulfonyl)imide ion ($[N(FSO_2)_2]^-$), nitrate ion, hydrogen sulfate ion, $Al_2Cl_7^-$, $Al_3Cl_{10}^-$, $AlCl_4^-$, trifluoroacetate ion, trifluoro(trifluoromethyl)borate ion, thiocyanate ion, dimethyl phosphate ion, and combinations thereof.

Where present, the plasticizer of polymer electrolyte membrane layer 12 generally serves the function of dissociating the ions and increasing the flexibility of the chains of the polymer material. The plasticizer may be solid plasticizer. Exemplary plasticizers include dinitriles, such as succinonitrile, glutaronitrile, and adiponitrile, octyl-2-cyanoacrylate, carbonates having relatively high flash points, such as propylene carbonate, ethylene carbonate, 1,2-butylene carbonate, and dimethyl carbonate, low molecular weight poly (ethylene glycol) (PEG) derivatives, such as tetraethylene glycol dimethyl ether, and poly(ethylene glycol) (e.g. PEG having $M_w$ from 200-500 g/mol), and combinations thereof.

Where present, the filler of polymer electrolyte membrane layer 12 generally serves the function of improving the mechanical properties or flexoelectric properties. Exemplary fillers include silicon oxide, titanium oxide, aluminum oxide, tin oxide, zinc oxide, zirconium oxide, lead zirconate titanate, barium titanate, polyhedral oligomeric silsesquioxane (POSS), and combinations thereof.

With reference to embodiments where polymer electrolyte membrane layer 12 includes polymeric material and ionic material, polymer electrolyte membrane layer 12 may include polymeric material in an amount of from 40 wt. % to 90 wt. %, in other embodiments, from 60 wt. % to 80 wt. %, in other embodiments, from 65 wt. % to 75 wt. %, based on the total composition of the polymer electrolyte membrane layer 12. In these embodiments, polymer electrolyte membrane layer 12 may include ionic material in an amount of from 10 wt. % to 60 wt. %, in other embodiments, from 20 wt. % to 40 wt. %, in other embodiments, 25 wt. % to 35 wt. %, based on the total composition of the polymer electrolyte membrane layer 12. In one or more embodiments, polymer electrolyte membrane layer 12 may include ionic material in an amount of 30 wt. % or approximate thereto.

With reference to embodiments where polymer electrolyte membrane layer 12 includes polymeric material, ionic material, and plasticizer, polymer electrolyte membrane layer 12 may include polymeric material in an amount of from 10 wt. % to 70 wt. %, in other embodiments, from 15 wt. % to 60 wt. %, in other embodiments, from 15 wt. % to 35 wt. %, based on the total composition of the polymer electrolyte membrane layer 12. In these embodiments, polymer electrolyte membrane layer 12 may include ionic material in an amount of from 10 wt. % to 60 wt. %, in other embodiments, from 20 wt. % to 50 wt. %, in other embodiments, from 25 wt. % to 40 wt. %, based on the total composition of the polymer electrolyte membrane layer 12. In these embodiments, polymer electrolyte membrane layer 12 may include plasticizer in an amount of from 5 wt. % to 60 wt. %, in other embodiments, from 10 wt. % to 50 wt. %, in other embodiments, from 10 wt. % to 30 wt. %, in other embodiments, from 15 wt. % to 25 wt. %, in other embodiments, from 20 wt. % to 40 wt. %, based on the total composition of the polymer electrolyte membrane layer 12. In one or more embodiments, polymer electrolyte membrane layer 12 may include plasticizer in an amount of 20 wt. % or approximate thereto.

As disclosed above, polymer electrolyte membrane layer 12 may include a combination of polymeric materials. In one or more embodiments, the amounts of a combination of polymeric materials may be characterized by the ratio of a first polymeric material to a second polymeric material. In one or more embodiments, the ratio of a first polymeric material to a second polymeric material may be about 1:3 weight/weight (w/w), in other embodiments, from about 1:2 (w/w) to about 1:4 (w/w), in other embodiments, from about 1:1 (w/w) to 1:2 (w/w), in other embodiments, from about 1:4 (w/w) to 1:9 (w/w), in other embodiments, from about 1:5 (w/w) to 1:7 (w/w).

Where filler is present, polymer electrolyte membrane layer 12 may include filler in an amount of from 1 wt. % to 5 wt. %, and in other embodiments, from 2 wt. % to 3 wt. %, based on the total composition of the polymer electrolyte membrane layer 12.

In one or more embodiments, polymer electrolyte membrane layer 12 may be flexible. In one or more embodiments, the flexibility of polymer electrolyte membrane layer 12 may be characterized by the elastic modulus. In one or more embodiments, polymer electrolyte membrane layer 12 has elastic modulus of from 0.1 MPa to 1 GPa, in other embodiments, from 0.1 MPa to 100 MPa, in other embodiments, from 1 MPa to 100 MPa, in other embodiments, from 1 MPa to 10 MPa, in other embodiments, from 10 MPa to 50 MPa, in other embodiments, from 50 MPa to 100 MPa. In one or more embodiments, polymer electrolyte membrane layer 12 may have elastic modulus of 22.5 MPa or approximate thereto. In one or more embodiments, polymer electrolyte membrane layer 12 may have elastic modulus of 0.35 MPa or approximate thereto. In one or more embodiments, polymer electrolyte membrane layer 12 may have elastic modulus of 3.4 MPa or approximate thereto.

In one or more embodiments, the flexibility of polymer electrolyte membrane layer 12 may be characterized by the storage modulus. In one or more embodiments, polymer electrolyte membrane layer 12 has storage modulus of from 0.1 MPa to 1 GPa, in other embodiments, from 0.1 MPa to 100 MPa, in other embodiments, from 1 MPa to 10 MPa, in other embodiments, from 10 MPa to 50 MPa, in other embodiments, from 50 MPa to 100 MPa. In one or more embodiments, polymer electrolyte membrane layer 12 may have elastic modulus of 15.5 MPa or approximate thereto. In one or more embodiments, polymer electrolyte membrane layer 12 may have storage modulus of 0.5 MPa or approximate thereto. In one or more embodiments, polymer electrolyte membrane layer 12 may have storage modulus of 6.5 MPa or approximate thereto.

In one or more embodiments, polymer electrolyte membrane layer 12 may have low energy dissipation during deformation. In one or more embodiments, the low energy dissipation of polymer electrolyte membrane layer 12 may be characterized by the loss modulus. In one or more embodiments, polymer electrolyte membrane layer 12 has loss modulus of from 0.01 MPa to 10 MPa, in other embodiments, from 0.1 MPa to 1.0 MPa, in other embodiments, from 0.1 MPa to 0.3 MPa, in other embodiments, from 0.3 MPa to 0.5 MPa, in other embodiments, from 0.5 MPa to 0.8 MPa, in other embodiments, from 0.8 MPa to 1.0 MPa. In one or more embodiments, polymer electrolyte membrane layer 12 may have loss modulus of 0.5 MPa or approximate thereto. In one or more embodiments, polymer electrolyte membrane layer 12 may have loss modulus of 0.2 MPa or approximate thereto. In one or more embodiments, polymer electrolyte membrane layer 12 may have loss modulus of 0.1 MPa or approximate thereto.

In one or more embodiments, polymer electrolyte membrane layer 12 may be stretchable. In one or more embodiments, the stretchability of polymer electrolyte membrane layer 12 may be characterized by the elongation at break. In one or more embodiments, polymer electrolyte membrane layer 12 has elongation at break of from 2% to 200%, in other embodiments, from 2% to 10%, in other embodiments, from 10% to 100%, in other embodiments, from 100% to 150%. In one or more embodiments, polymer electrolyte membrane layer 12 may have elongation at break of 7% or approximate thereto. In one or more embodiments, polymer electrolyte membrane layer 12 may have elongation at break of 80% or approximate thereto.

In one or more embodiments, polymer electrolyte membrane layer 12 may be isotropic. In one or more embodiments, polymer electrolyte membrane layer 12 may have phase separated structure.

In one or more embodiments, polymer electrolyte membrane layer 12 may be characterized as amorphous. In one or more embodiments, polymer electrolyte membrane layer 12 may be characterized as transparent. In one or more embodiments, polymer electrolyte membrane layer 12 may be characterized as non-flammable, which may be defined as having a flash point above 80° C.

In one or more embodiments, polymer electrolyte membrane layer 12 may be characterized by the branched chain architecture of the crosslinked network. In one or more embodiments, polymer electrolyte membrane layer 12 has branched chain architecture of the crosslinked network of 3-arm architecture, in other embodiments, 4-arm architecture.

In one or more embodiments, polymer electrolyte membrane layer 12 may be characterized by the molecular weight between crosslinked points. In one or more embodiments, polymer electrolyte membrane layer 12 has average molecular weight between crosslinked points of from 400 g/mol to 20000 g/mol, in other embodiments, from 500 g/mol to 10000 g/mol, in other embodiments, from 650 g/mol to 850 g/mol, in other embodiments, from 1500 g/mol to 2500 g/mol, and in other embodiments, from 5000 g/mol to 7000 g/mol.

In one or more embodiments, polymer electrolyte membrane layer 12 may be characterized by the ionic conductivity. In one or more embodiments, polymer electrolyte membrane layer 12 has ionic conductivity of from $10^{-9}$ S/cm to $10^{-3}$ S/cm, in other embodiments, from $10^{-5}$ S/cm to $10^{-3}$ S/cm, and in other embodiments, from $10^{-4}$ S/cm to $10^{-3}$ S/cm.

In one or more embodiments, polymer electrolyte membrane layer 12 may be characterized by a low glass transition temperature. In one or more embodiments, this may be characterized as having a glass transition temperature of from about −40° C. to about −80° C., in other embodiments, from about −40° C. to about −60° C. Thus, polymer electrolyte membrane assembly 10 may be suitable for low temperature applications in cold weather.

In one or more embodiments, polymer electrolyte membrane layer 12 may be characterized by thickness. In one or more embodiments, polymer electrolyte membrane layer 12 has a thickness of from 0.1 mm to 3 mm, in other embodiments, from 0.1 mm to 0.6 mm, in other embodiments, from 0.6 mm to 1 mm, and in other embodiments, from 1 mm to 3 mm.

In one or more embodiments, polymer electrolyte membrane layer 12 may have a composition designed for sequestration of certain gases. In one or more embodiments, polymer electrolyte membrane layer 12 may allow $CO_2$ sequestration to convert the end-functionality of the side chains into active functional groups (i.e. carbonate or carbamates) for one or more functions of plasticizing the network chains and weakening ion-dipole complexation. In one or more embodiments, polymer electrolyte membrane layer 12 may allow $O_2$ sequestration as generally known for a Li-oxygen battery. In one or more embodiments, polymer electrolyte membrane layer 12 may allow Ar gas sequestration to prevent contamination by reactants from air, such as moisture.

In one or more embodiments, polymer electrolyte membrane layer 12 may be characterized by flexoelectric coefficient. Flexoelectric coefficient ($e_{33}$) generally relates to a materials capability to transform energy. Higher flexoelectric coefficients generally indicate greater electrical energy conversion from mechanical deformation. Though voltage output and current output of a polymer electrolyte membrane layer 12 may depend on the dimensions and bending curvature (that is, a larger material or material under higher bending will generally generate higher voltage and current output), the flexoelectric coefficient is an inherent property of the material. A material will have a certain flexoelectric coefficient, regardless of the size dimensions and bending state. Flexoelectric coefficient may be calculated from a polarization vs. strain gradient plot, for example, by analyzing the slope of a fitted straight line in a plot of polarization vs. strain gradient.

In one or more embodiments, polymer electrolyte membrane layer 12 may have a flexoelectric coefficient in a range of from 20 µC/m to 400 µC/m, in other embodiments, from 50 µC/m to 150 µC/m, in other embodiments, from 150 µC/m to 200 µC/m. In one or more embodiments, polymer electrolyte membrane layer 12 may have a flexoelectric coefficient in a range of 150 µC/m or more, in other embodiments, 200 µC/m or more, in other embodiments, 300 µC/m or more, and in other embodiments, 320 µC/m or more.

Polymer electrolyte membrane layer 12 may be prepared by any suitable polymerization method known to those skilled in the art. In one or more embodiments, polymer electrolyte membrane layer 12 may be prepared via free radical polymerization by UV irradiation with suitable photo initiators. In one or more embodiments, polymer electrolyte membrane layer 12 may be prepared via free radical polymerization by thermal curing, with suitable appropriate thermal initiators.

First flexible electrode layer 14 and second flexible electrode layer 16 may be made from any suitable materials that allow the flow of electricity to pass therethrough. As used herein, the term electrode layer is to be interpreted broadly as including at least one electrode. In one or more embodiments, an electrode layer may be embodied by a plurality of electrodes that may be operated independently.

In one or more embodiments, first flexible electrode layer 14 and second flexible electrode layer 16 may be made from a composition including electron-conductive material and binder material. Exemplary electron-conductive material includes carbon black, single-walled carbon nanotubes, multi-walled carbon nanotubes, mesoporous carbon, activated carbon, graphene, conductive polymers, such as polyanilines, poly(pyrrole)s, poly(3,4-ethylenedioxythiophene) and poly(p-phenylene sulfide), and combinations thereof.

Exemplary binder material includes polymer electrolyte solution (that is, the precursor solution to make polymer electrolyte membrane layer 12), polyvinylidene fluoride (PVDF), polyvinylidene fluoride-trifluoroethylene (PVDF-TrFE), carboxylic methyl cellulose (CMC), thiosiloxanes, polysiloxanes, poly(ethylene glycol) diacrylate, poly(ethylene glycol), poly(ethylene glycol) dimethylacrylate, poly(acrylic acid), polyethylenimine, polyacrylonitrile, carboxyl terminated butadiene-acrylonitrile, polyurethanes, sulfonated polyisoprene, polycarbamates, polycarbonates, zwitterionic polymers, and combinations thereof.

In one or more embodiments, first flexible electrode layer 14 and second flexible electrode layer 16 may include electron-conductive material in an amount of from 40 wt. % to 80 wt. %, in other embodiments, from 40 wt. % to 60 wt. %, in other embodiments, from 50 wt. % to 60 wt. %, based on the total composition of first flexible electrode layer 14 and second flexible electrode layer 16. In one or more embodiments, first flexible electrode layer 14 and second flexible electrode layer 16 may include binder material in an amount of from 20 wt. % to 60 wt. %, in other embodiments, from 40 wt. % to 60 wt. %, in other embodiments, from 20 wt. % to 40 wt. %, in other embodiments, from 45 wt. % to 55 wt. %, based on the total composition of first flexible electrode layer 14 and second flexible electrode layer 16.

As disclosed above, first flexible electrode layer 14 and second flexible electrode layer 16 may include a combination of electron-conductive material. In one or more embodiments, the amounts of a combination of electron-conductive materials may be characterized by the ratio of a first electron-conductive material to a second electron-conductive material. In one or more embodiments, the ratio of a first electron-conductive material to a second electron-conductive material may be about 1:1 (w/w), in other embodiments, from about 1:0.8 (w/w) to about 1:1.2 (w/w), in other embodiments, from 1:1 (w/w) to 1:5 (w/w), in other embodiments, from 1:3 (w/w) to 1:9 (w/w), in other embodiments, from 1:1 (w/w) to 1:2 (w/w).

In one or more embodiments, first flexible electrode layer 14 and second flexible electrode layer 16 may have the same composition. In one or more embodiments, first flexible electrode layer 14 and second flexible electrode layer 16 may have different compositions.

In one or more embodiments, first flexible electrode layer 14 and second flexible electrode layer 16 may be characterized by thickness. In one or more embodiments, first flexible electrode layer 14 has a thickness of from 10 μm to 60 μm, in other embodiments, from 20 μm to 40 μm, and in other embodiments, from 25 μm to 35 μm. In one or more embodiments, second flexible electrode layer 16 has a thickness of from 10 μm to 60 μm, in other embodiments, from 20 μm to 40 μm, and in other embodiments, from 25 μm to 35 μm.

In one or more embodiments, one of first flexible electrode layer 14 and second flexible electrode layer 16 is a cathode and the other of first flexible electrode layer 14 and second flexible electrode layer 16 is an anode. In one or more embodiments, first flexible electrode layer 14 and second flexible electrode layer 16 may each be cathodes. In one or more embodiments, first flexible electrode layer 14 and second flexible electrode layer 16 may each be anodes.

In one or more embodiments, first flexible electrode layer 14 and second flexible electrode layer 16 may be characterized by the electrical conductivity. In one or more embodiments, first flexible electrode layer 14 has a conductivity of from 10 S/m to $10^6$ S/m, in other embodiments, from $10^2$ S/m to $10^4$ S/m, and in other embodiments, from $10^3$ S/m to $10^4$ S/m. In one or more embodiments, second flexible electrode layer 16 has a conductivity of from 10 S/m to $10^6$ S/m, in other embodiments, from $10^2$ S/m to $10^4$ S/m, and in other embodiments, from $10^3$ S/m to $10^4$ S/m.

In one or more embodiments, first flexible electrode layer 14 and second flexible electrode layer 16 may have flexibility and stretchability properties comparable to polymer electrolyte membrane layer 12 such that first flexible electrode layer 14 and second flexible electrode layer 16 do not crack or break when polymer electrolyte membrane assembly 10 is bent.

In one or more embodiments, first flexible electrode layer 14 and second flexible electrode layer 16 may be made by a method similar to solution casting. This method of manufacture may include a substrate for the casting process. In one or more embodiments, the substrate may be a sheet made from a material selected from the group consisting of polytetrafluoroethylene (PTFE), polyvinylidene fluoride (PVDF), polyvinyl chloride (PVC), and polyethylene terephthalate (PET).

In one or more particular embodiments, the polymeric material may be selected from the group consisting of poly(ethylene glycol) diacrylate, poly(ethylene glycol) dimethylacrylate, and thiosilxanes. In one or more particular embodiments, the ionic material may have cations selected from the group consisting of 1-Ethyl-3-methylimidazolium and 1-Butyl-3-methylimidazolium and anions selected from the group consisting of $PF_6^-$, $CF_3SO_2^-$, and $[N(C_2F_5SO_2)_2]^-$. In one or more particular embodiments, the plasticizer may be selected from the group consisting of succinonitrile, propylene carbonate, and ethylene carbonate. In one or more particular embodiments, the electron-conductive material may be selected from the group consisting of carbon black, single-walled carbon nanotubes, multi-walled carbon nanotubes, and graphene. In one or more particular embodiments, the binder material may be selected from the group consisting of polyvinylidene fluoride and carboxylic methyl cellulose.

Figure 3:
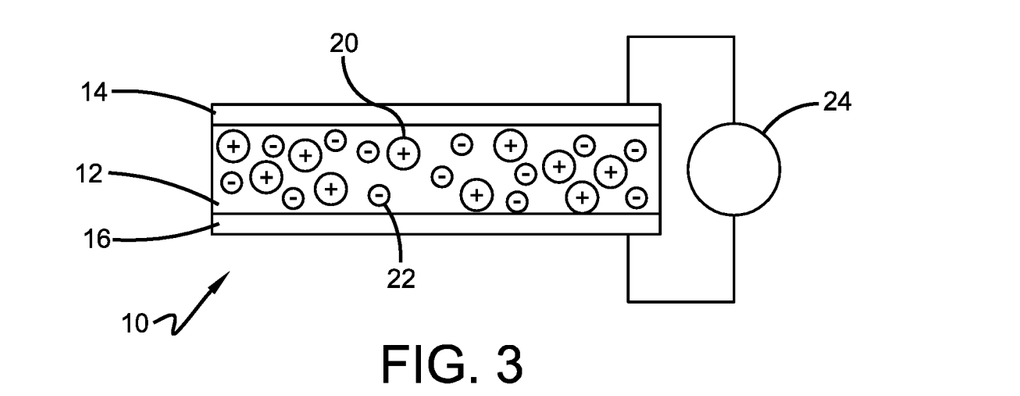
FIG. 3 is a schematic of the polymer electrolyte membrane assembly showing the general electric charge of the polymer electrolyte membrane assembly in an unbent position.
Figure 4:
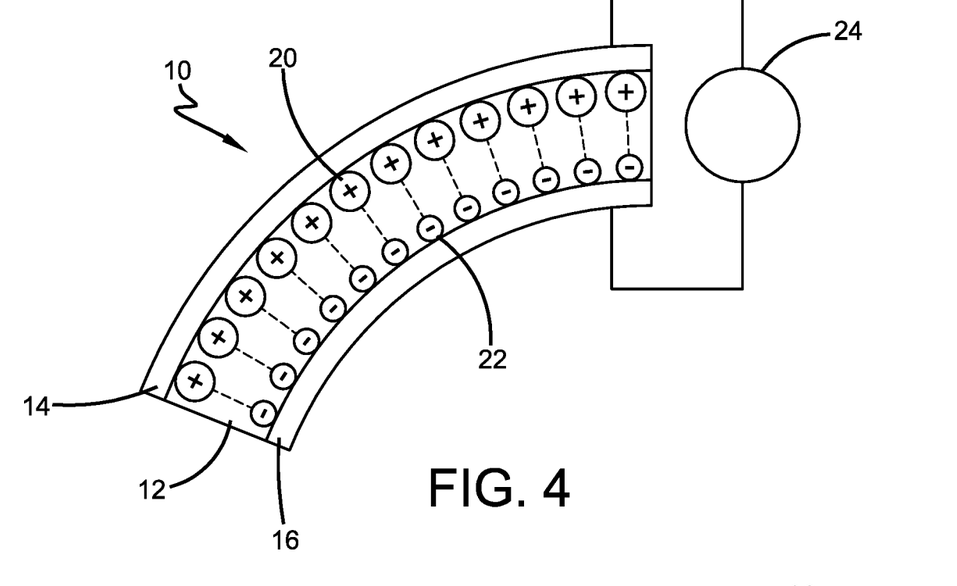
FIG. 4 is a schematic of the polymer electrolyte membrane assembly showing the general electric charge of the polymer electrolyte membrane assembly in a bent position.

As mentioned above, and as represented in FIG. 3, polymer electrolyte membrane layer 12 has an initial ion concentration gradient. Polymer electrolyte membrane layer 12 includes a plurality of positive ions 20 and a plurality of negative ions 22, arranged in an initial position. Upon bending the polymer electrolyte membrane layer 12 as part of polymer electrolyte membrane assembly 10, as shown in FIG. 4, the initial ion concentration gradient will change to a second ion concentration gradient different from the initial ion concentration gradient. As shown in FIG. 4, plurality of positive ions 20 and plurality of negative ions 22 are rearranged to cause a change in ion concentration within polymer electrolyte membrane layer 12 when it is deformed. This generates an ion concentration gradient within polymer electrolyte membrane layer 12, exerting strong ion polarization against first flexible electrode layer 14 and second flexible electrode layer 16. This alters the open circuit voltage ($V_{oc}$) value from the initial open circuit voltage value, which is observed as a peak on a voltage graph, which may be an upward peak or downward peak depending on the direction of deformation. The peaks on the voltage graph represent a generated electrical signal, which may also be characterized as an electrical potential difference between first flexible electrode layer 14 and second flexible electrode layer 16. By coupling first flexible electrode layer 14 and second flexible electrode layer 16 with an electrical component 24, which may be an energy storage device, such as a battery, the electrical energy can be collected and stored. For charging and discharging to and from electrical component 24, it should be appreciated that polymer electrolyte membrane layer 12 acts as a capacitor.

The coupling of first flexible electrode layer 14 and second flexible electrode layer 16 with electrical component 24 is generally known to those skilled in the art. The skilled person will also know how to utilize one or more generally known electrical components, such as galvanostats, potentialstats, voltmeters, ampere meters, and the like, to achieve a desired function.

In one or more embodiments, polymer electrolyte membrane layer 12 may be characterized as not cracking or creasing upon repeated bending.

In one or more embodiments, polymer electrolyte membrane layer 12 may be characterized by current output upon bending. Though, as disclosed elsewhere herein, current output is generally dependent on the size of the material. In one or more embodiments, polymer electrolyte membrane layer 12 may provide a current output in the range of from 1 nA to 10 µA, in other embodiments, from 1 nA to 100 nA, and in other embodiments, over 1 µA. These current outputs may be related to a material having dimensions of 15 mm×6 mm×0.6 mm.

In one or more embodiments, electrical component 24 may be an electrical energy source, such as a DC voltage supplier, for applying electrical energy to polymer electrolyte membrane assembly 10. This application of electrical energy to polymer electrolyte membrane assembly 10 may cause polymer electrolyte membrane assembly 10 to mechanically deform, as by bending. Thus, polymer electrolyte membrane assembly 10 may be utilized as an actuator.

In one or more embodiments, the applied electric energy may be in a range of from about 1 V to about 5 V, in other embodiments, from about 1 V to about 3 V, and in other embodiments, from about 1 V to about 1.5 V. In one or more embodiments, the applied electric energy may be less than 5 V, in other embodiments, less than 3 V, in other embodiments, less than 1 V, and in other embodiments, less than 0.5 V.

Based on the above, it should be appreciated that polymer electrolyte membrane assembly 10 may be utilized in many suitable applications. Polymer electrolyte membrane assembly 10 may be utilized as a strain sensor, a tactile sensor (i.e. artificial skin), hyper sensitive sensors, a soft actuator (i.e. artificial muscles), and an energy harvesting device, in a wearable device, and in flexoelectric tires.

In one or more embodiments of polymer electrolyte membrane assembly 10 utilized as an energy harvesting device, polymer electrolyte membrane assembly 10 may be adapted to harvest energy from one or more of wind and ocean waves.

In one or more embodiments of polymer electrolyte membrane assembly 10 utilized as an energy harvesting device, polymer electrolyte membrane assembly 10 may be adapted to harvest energy from a vibrating part, such as a vehicle part. For example, polymer electrolyte membrane assembly 10 may be utilized with one or more of a chassis, shock absorber, and suspension.

Figure 5:
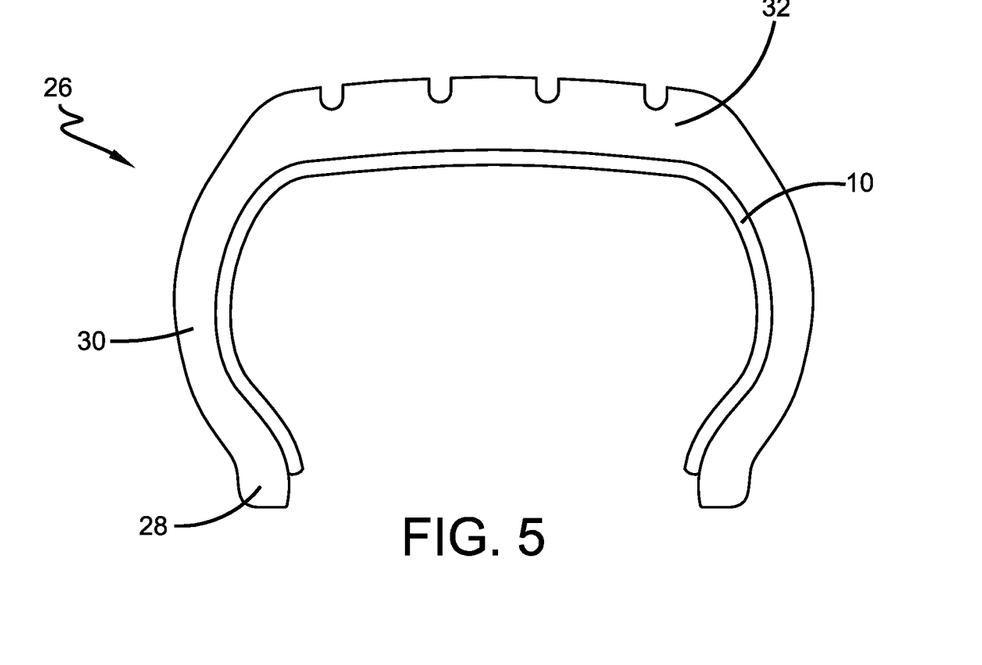
FIG. 5 is a schematic of the polymer electrolyte membrane assembly utilized in a tire.

In one or more embodiments, polymer electrolyte membrane assembly 10 may be utilized with a flexoelectric pneumatic tire 26. As generally known to the skilled person, flexoelectric pneumatic tire 26 may be formed as a conventional tire, having a pair of beads 28, a pair of sidewalls 30, and a tread 32. As shown in FIG. 5, in one or more embodiments, polymer electrolyte membrane assembly 10 may be embedded in flexoelectric pneumatic tire 26 as a composite layer of flexoelectric pneumatic tire 26. In one or more embodiments, polymer electrolyte membrane assembly 10 may be adhered on the interior wall of flexoelectric pneumatic tire 26. Polymer electrolyte membrane assembly 10 will deform simultaneously with flexoelectric pneumatic tire 26 and will thereby be capable of generating an electrical signal as described herein. Polymer electrolyte membrane assembly 10 is able to transform dynamic energy into electrical signal via compression and bending.

In one or more embodiments, a method of manufacturing polymer electrolyte membrane assembly 10 includes forming a first flexible electrode. This may be performed by generating a slurry of any of the above compositions for the flexible electrodes. The first flexible electrode is formed as generally known to those skilled in the art, and the polymer electrolyte membrane layer may then be cast on top of the first flexible electrode. The polymer electrolyte membrane layer may then be cured, e.g. photo-cured with UV-light. The second flexible electrode may then be placed on the cast polymer electrolyte membrane layer. Methods for making the first flexible electrode, the second flexible electrode, and polymer electrolyte membrane layer may include mixing until complete homogenization.

In one or more embodiments, a method of manufacturing polymer electrolyte membrane assembly 10 may be devoid of solvent. In one or more embodiments, a method of manufacturing polymer electrolyte membrane assembly 10 may be devoid of pre-treatment (e.g. poling, as required for PVDF).

In one or more embodiments, a method of harvesting electrical energy may include steps of providing a polymer electrolyte membrane assembly, as described herein, coupled with an energy storage device. The polymer electrolyte membrane assembly has an open circuit voltage having an initial ion concentration gradient. A step of allowing the polymer electrolyte membrane assembly to bend may thereby produce a second ion concentration gradient different from the initial ion concentration gradient. A step of collecting, with the energy storage device, electrical energy formed by the second ion concentration gradient may then be performed.

In one or more embodiments, a method of electrical actuation may include steps of providing a polymer electrolyte membrane assembly, as described herein, coupled with an electrical energy source. The polymer electrolyte membrane assembly has an open circuit voltage having an initial ion concentration gradient. A step of applying, with the electrical energy source, electrical energy to the polymer electrolyte membrane assembly may be performed such that the polymer electrolyte membrane assembly acts as an electrical actuator.

Without being bound by any theory, the polymer electrolyte membrane assembly disclosed herein operates based on a principle of ionic polarization under deformation. This can be distinguished from the electronic polarization in conventional ceramic (i.e. lead zirconate titanate (PZT)) and other conventional polymer piezoelectric materials.

One or more embodiments of the present invention have industrial applicability as providing a polymer electrolyte membrane assembly useful as one or more of a strain sensor, a tactile sensor (i.e. artificial skin), hyper sensitive sensors, a soft actuator (i.e. artificial muscles), and an energy harvesting device, in a wearable device, and in flexoelectric tires.

In light of the foregoing, it should be appreciated that the present invention advances the art by providing an improved polymer electrolyte membrane assembly and corresponding methods of use. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLES

Example 1

A polymer electrolyte membrane assembly prepared in accord with the above description, having dimensions of 15 mm×6 mm×0.5 mm, was able to generate millivolts in a range of from 5 to 10 millivolts with wind speed in a range of from 5 to 15 mph.

Example 2

Electrodes were prepared from a mixture of carbon black (CB) (25 wt. %), carbon nanotubes (CNT) (25 wt. %), and PVDF (50 wt. %). A slurry with the aforementioned materials used 4-6 mL of N-methyl-2-pyrrolidone (NMP).

Various polymer electrolyte membrane layer materials were utilized. These mixtures were mixed at 60-70° C. until complete homogenization. The completely miscible mixtures were casted on the electrodes and photo-cured with UV-light at an intensity of 5 mW/cm$^2$ for 15-20 minutes at ambient temperature.

Certain polymer electrolyte membrane layer materials included mixtures of polymeric materials thiosiloxane and poly(ethylene glycol) diacrylate, with an ionic liquid. The mixtures thiosiloxane and poly(ethylene glycol) diacrylate were prepared at 90 wt. %, 70 wt. %, and 50 wt. % of the total composition, with the ionic liquid making up 10 wt. %, 30 wt. %, and 50 wt. %, respectively.

The flexoelectric effect was characterized by combining a Dynamic Mechanical Analysis (DMA) device and a Solartron Potentionstat/Galvanometric Analyzer for measuring open-circuit potential ($V_{oc}$) (or voltage) and short circuit current ($I_{SC}$) (or current). Current refers exclusively to the electricity collected when the samples were bent. A square wave input displaced the samples between 2-5 mm.

For the 90 wt. % polymeric material 10 wt. % ionic liquid sample: for displacement of 2 mm, current was about 0.015 µA; for displacement of 3 mm, current was about 0.025 µA; for displacement of 4 mm, current was about 0.032 µA; and for displacement of 5 mm, current was about 0.04 µA.

The flexoelectric coefficient ($e_{33}$) was calculated from the polarization vs. strain gradient plot. The total polarization is the ratio between the total amount of charges generated (Q) by deformation and the area of the sample (A). From the slope of the resulting fitted straight lines in the plots of polarization vs. strain gradient, the flexoelectric coefficient was determined based on the slope of the lines. The flexoelectric response was found to be higher than other known materials with the sample electro-mechanical response.

For the 90 wt. % polymeric material 10 wt. % ionic liquid sample, the flexoelectric coefficient was 83 µC/m. For the 70 wt. % polymeric material 30 wt. % ionic liquid sample, the flexoelectric coefficient was 154 µC/m. For the 50 wt. % polymeric material 50 wt. % ionic liquid sample, the flexoelectric coefficient was 104 µC/m.

Dynamic mechanical deformation was also applied to the samples. A sinusoidal wave with different amplitudes was utilized. Open-circuit potential ($V_{oc}$) and current ($I_{SC}$) were tracked under dynamic oscillatory stress or strain in cantilever bending mode. The $V_{oc}$ and $I_{SC}$ responses were measured based on dynamic deformation for a sinusoidal wave input with amplitudes of the bending curvature ranging from 24.5 m$^{-1}$ to 71.5 m$^{-1}$.

When sinusoidal-wave like deformation was applied (at a given frequency e.g., 1 Hz), there was a corresponding generation of sinusoidal-wave like voltage and current outputs. This type of bending deformation may happen when flexible polymer electrolyte assemblies are under vibration. Higher amplitudes of oscillations (e.g., bending curvature ranging between 6.0 m$^{-1}$ to 71.5 m$^{-1}$), resulted in higher amplitude of electrical outputs. For the 70 wt. % polymeric material 30 wt. % ionic liquid sample, the amplitude of the output current was about 0.04 µA under 24.5 m$^{-1}$ (amplitude of bending curvature) oscillation at 1 Hz. For the 70 wt. % polymeric material 30 wt. % ionic liquid sample, the amplitude of the output current was about 0.11 µA under 71.5 m$^{-1}$ (amplitude of bending curvature) oscillation at 1 Hz. For the 90 wt. % polymeric material 10 wt. % ionic liquid sample, the amplitude of the output voltage was about 0.18 mV under 24.5 m$^{-1}$ (amplitude of bending curvature) oscillation at 1 Hz. For the 90 wt. % polymeric material 10 wt. % ionic liquid sample, the amplitude of the output voltage was about 0.35 mV under 71.5 m$^{-1}$ (amplitude of bending curvature) oscillation at 1 Hz.

Example 3

Certain materials used in Example 3 are listed and abbreviated in Table 1.

TABLE 1

| List of materials | |
|---|---|
| Name | Abbreviation |
| Poly(ethylene glycol) diacrylate | PEGDA |
| lithium bis(trifluoromethane)sulfonimide | LiTFSI |
| 1-Hexyl-3-methylimidazolium Bis(trifluoromethanesulfonyl)imide | MetHexTFSI |
| poly(vinylidene fluoride) | PVDF |
| succinonitrile | SCN |
| 1-Methyl-2-pyrrolidinone | NMP |
| Carbon black | CB |
| Multi-walled carbon nanotubes | MWCNT |

Electrodes were fabricated and were composed of MWCNT, CB, and PVDF. MWCNT and CB were used as conductive materials while PVDF was used as a binder material. The preparation procedure was 0.025 g of MWCNT, 0.025 g CB, 0.05 g PVDF, and 6 mL NMP were added into a 20 mL glass vial. The mixture was then sonicated until MWCNT and CB were well dispersed in NMP, forming a viscous slurry. The slurry was then coated onto a polytetrafluoroethylene (PTFE) substrate with a doctor blade (film applicator) at 75° C. The as-coated electrodes were further dried in a fume hood under 75° C. overnight. The thickness of the electrode coating was around 20 µm.

Polymer electrolyte membranes (PEMs) were fabricated through photo curing of precursor materials. To prepare the precursor materials, various binary mixtures of PEGDA/

LiTFSI and PEGDA/MetHexTFSI and ternary mixtures of PEGDA/SCN/LiTFSI were melt-blended at 70° C. until completely mixed. To be kept away from moisture, the precursor mixtures were kept in a glovebox under continuous nitrogen flow prior to use.

Before fabricating polymer electrolyte membranes (PEMs), 2 wt. % of Irgacure® 651, in reference to the PEGDA amount, was added into each precursor mixture as a photo-initiator. The precursor mixtures were then casted onto a glass substrate. Casted precursors were exposed to UV-light at an intensity of 5 mW/cm² for 15-20 minutes at ambient temperature for curing. After curing, electrodes and PEMs were stacked together, forming a sandwich structure. The stacked PEMs were then kept in the glovebox overnight before measurement.

The measurement of flexoelectric properties generally involved two parts: 1. applying the mechanical deformation to the PEM samples (mechanical input, including square wave measurement, sinusoidal wave measurement and frequency sweep measurement), where the mechanical deformation was controlled by dynamic mechanical analyzer (DMA); 2. monitoring the electrical voltage/current generated by the PEM samples (electrical output). For the measurements mentioned above, the electrical output was monitored by Potentialstat/Galvanostat. The electrical outputs were measured in two ways separately, the open circuit voltage ($V_{oc}$) and the short circuit current ($I_{sc}$). Open circuit voltage monitored the electrochemical potential difference between two electrodes. Short circuit current measured the current that the electrochemical cell generates when the external load is 0Ω. The flexoelectric coefficient can be calculated by following equation:

$$e_{33} = \frac{P}{\frac{\partial u}{\partial x}} = \frac{Q}{A\frac{\partial u}{\partial x}}$$

where $e_{33}$ is the flexoelectric coefficient, P is the polarization, $\partial u/\partial x$ is the strain gradient or the bending curvature in a deformed sample, and A is the sample surface area. Generally, higher flexoelectric coefficient means the material can generate more electrical energy from the same mechanical deformation. In other words, materials that has higher flexoelectric coefficient can transform mechanical into electrical energy more efficiently.

Ionic conductivity of various PEMs was determined by using AC impedance spectroscopy. Binary/ternary mixtures of were first prepared as precursors for fabricating PEM membranes.

The ionic conductivity was measured by using an impedance analyzer (HP4192A LF). The AC impedance measurement was conducted in a frequency range from 1 MHz to 0.01 Hz. In order to measure the ionic conductivity under various temperatures, the cell was placed in a hot chamber with temperature controller (Omron E5AK). The cell was equilibrated at certain temperature for 10 mins before each AC impedance measurement.

The mechanical properties of PEMs, including elastic modulus, storage modulus, loss modulus, and elongation at break were determined by using dynamic mechanical analyzer (DMA Q800, TA instruments). PEM with thickness of 0.15 mm were cut into 5 mm wide strips. The samples were tested under tension mode in a frequency range from 0.01 Hz to 10 Hz.

Direct flexoelectric effect was observed for PEM assembly with the composition of PEGDA/SCN/LiTFSI 20/40/40 wt. %. The sample was connected to the potentiostat with working electrode (WE) probe on the left and counter electrode (CE) on the right. The potentiostat monitored the open circuit voltage (OCP) of the PEM assembly, which was the potential difference between two electrodes on each side of the sample. Initially, the OCP was around 96 mV and was stable when the sample was not deformed. When the air flow was applied to the sample from the right, the sample bent to WE side and the OCP dropped to 90 mV. The OCP kept constant at around 90 mV until the air flow was removed. Similarly, when the air flow was applied from the left side, the sample bent to CE side and the OCP increased to about 104 mV and kept constant until the air flow was removed. This showed that about 6-8 mV electrical voltage was generated when the sample was deformed. The PEM assembly converted part of the mechanical energy of the bending deformation to the electrical energy.

A PEM assembly with the same composition (PEGDA/SCN/LiTFSI) was connected to an external voltage supplier. The deformation of the PEM assembly under external electrical voltage was captured by a video camera. The displacement of the free end of the PEM assembly was recorded. The input of the electrical voltage followed a square wave, with the step length of 60s. The displacement of the tip when the electrical voltage was switched between 3 V and −3 V was recorded. The sample bent to right when the voltage was 3V and it bent to the opposite direction when the applied voltage was switched to −3V. The maximum displacement was about 1.2 mm. This result showed a converse flexoelectric effect.

Flexoelectric properties of PEMs assemblies with various compositions were studied. The bending induced polarization against bending curvature for multiple PEM assemblies were charted. All the samples showed linear increase of polarization with bending curvature. The slope of each linear fitting result indicated the flexoelectric coefficient of the PEM assembly. Binary mixture (PEGDA/LiTFSI 60/40 wt. %) showed $e_{33}$ value of 43 µC/m. When 20% of SCN was added (PEGDA/SCN/LiTFSI 40/20/40 wt. %), the $e_{33}$ value increased to 323 µC/m. Without being bound by theory, this improvement might come from the strong ionization effect of SCN, which increased the amount of free ion in the system. The free ions can contribute to the polarization process. When the SCN was further increased to 40% (20/40/40 wt. %), the $e_{33}$ value dropped to 206 µC/m. Even though higher SCN content may result in higher free ion concentration, a strong plasticization effect may lead to an ultra-flexible network. It is possible that the pressure gradient of the PEMs decreased at high SCN content, and therefore, brought down the total polarization. The flexoelectric coefficient of PEMs compared to certain Comparison compositions are listed in the following Table 2. The flexoelectric coefficients of PEM composed of PEGDA/SCN/LiTFSI were found to be higher than that of piezoelectric ceramics, piezoelectric polymers, liquid crystals, and liquid crystal elastomers.

TABLE 2

Flexoelectric coefficient values

| Composition of the matrix | Flexoelectric coefficient measured under square wave input (µC/m) |
| --- | --- |
| PEGDA/SCN/LiTFSI 20/40/40 wt. % | 206 |
| PEGDA/SCN/LiTFSI 40/20/40 wt. % | 323 |

TABLE 2-continued

Flexoelectric coefficient values

| Composition of the matrix | Flexoelectric coefficient measured under square wave input (μC/m) |
|---|---|
| PEGDA/SCN/LiTFSI 60/0/40 wt. % | 43 |
| Comparison 1: Bent-core liquid crystal elastomer | 50 nC/m |
| Comparison 2: Crystalline PVDF | ~35 μC/m |
| Comparison 3: PbZrTiO$_3$ | 1.4 μC/m |

The flexoelectric property of PEM assemblies made of binary mixtures was evaluated. The mechanical input and the corresponding electrical output of PEM assembly composed of PEGDA/LiTFSI 90/10 wt. % and PEM assembly composed of PEGDA/HetMexTFSI 90/10 wt. % were evaluated. The input movements followed square waves, with higher displacement meaning the sample was being deformed to a larger curvature. The voltage output followed the mechanical input, in a form of square waves. The amplitude of the OCP increased with the mechanical input. It could be seen that the PEM assemblies generated higher voltage output with higher mechanical deformation. The current output was a set of relaxation peaks. The PEM assembly composed of PEGDA/LiTFSI generated negative OCP when being deformed. The PEM assembly composed of PEGDA/HetMexTFSI generated positive OCP when being deformed. This indicated that the orientation of the ionic dipoles generated in PEM assembly composed of PEGDA/LiTFSI during bending is opposite to that generated in PEM assembly composed of PEGDA/HetMexTFSI.

The integration of each determined current relaxation peak gave the amount of ionic polarization induced by a single bending deformation. For both PEMs assemblies, the induced ionic polarization increased linearly with the bending curvature. The slope of each linear fitting line gave the value of flexoelectric coefficient. The flexoelectric coefficient of PEM assembly composed of PEGDA/LiTFSI 90/10 wt. % and PEM assembly composed of PEGDA/HetMexTFSI 90/10 wt. % was about 19 μC/m and 56 μC/m, respectively. Similar measurements were conducted on PEM assemblies with various compositions, shown in Table 3.

TABLE 3

Flexoelectric coefficient values

| Composition | Flexoelectric coefficient measured under square wave input (μC/m) |
|---|---|
| PEGDA/LiTFSI 90/10 wt. % | 19 |
| PEGDA/LiTFSI 70/30 wt. % | 54 |
| PEGDA/LiTFSI 50/50 wt. % | 36 |
| PEGDA/MetHexTFSI 90/10 wt. % | 56 |
| PEGDA/MetHexTFSI 70/30 wt. % | 162 |
| PEGDA/MetHexTFSI 50/50 wt. % | 136 |

The flexoelectric coefficient of PEM assemblies was also measured under sinusoidal waves under various frequencies, ranging from 10 Hz to 0.01 Hz. The current output and voltage output of the PEM assemblies were determined. Both of the current and the voltage output were a set of sinusoidal waves with 1 Hz of frequency. The amplitude of the output increased with the amplitude of the input sinusoidal waves. In this case, the flexoelectric coefficient was calculated by:

$$e_{33} = \frac{I_0}{A\omega\kappa}$$

where A is the surface area of the sample, $I_0$ is the amplitude of the output current, $\omega$ is the angular frequency of the output current, $\kappa$ is the amplitude bending curvature. It was found that the PEM assemblies exhibited smaller flexoelectric coefficient at higher frequency.

Various modifications and alterations that do not depart from the scope and spirit of this invention will become apparent to those skilled in the art. This invention is not to be duly limited to the illustrative embodiments set forth herein.

What is claimed is:

1. An energy assembly comprising
a polymer electrolyte membrane assembly including a polymer electrolyte membrane layer positioned between a first electrode and a second electrode,
the polymer electrolyte membrane layer including a polymer matrix, a plasticizer, and an ionic material,
wherein the ionic material is selected from the group consisting of salt and ionic liquid,
wherein the polymer matrix is selected from the group consisting of thiosiloxanes, polysiloxanes, polydimethylsiloxane, poly(ethylene glycol), poly(ethylene glycol) diacrylate, poly(ethylene glycol) dimethylacrylate, poly(ethylene glycol) diamine, polyethylene glycol bis-carbamate, poly(acrylic acid), polyethylenimine, polyacrylonitrile, carboxyl terminated butadiene-acrylonitrile, polyurethanes, sulfonated polyisoprene, polycarbamates, polycarbonates, zwitterionic polymers, and combinations thereof,
wherein the plasticizer is selected from the group consisting of dinitriles, succinonitrile, glutaronitrile, adiponitrile, octyl-2-cyanoacrylate, propylene carbonate, ethylene carbonate, 1,2-butylene carbonate, dimethyl carbonate, tetraethylene glycol dimethyl ether, poly(ethylene glycol), and combinations thereof,
wherein the polymer electrolyte membrane layer has a flexoelectric coefficient of 150 μC/m or more; and
an electrical component coupled with the polymer electrolyte membrane assembly, the electrical component being selected from the group consisting of an energy storage device and an electrical energy source.

2. The assembly of claim 1, wherein the ionic material includes both cations and anions.

3. The assembly of claim 2, wherein the ionic material includes cations selected from the group consisting of lithium ion, sodium ion, potassium ion, calcium ion, magnesium ion, aluminum ion, iron ion, zirconium ion, imidazolium ions, 1-ethyl-3-methylimidazolium ion, 1-butyl-3-methylimidazolium ion, 1-allyl-3-methylimidazolium ion, 1-butyl-2,3-dimethylimidazolium ion, 1-decyl-3-methylimidazolium ion, 1-hexyl-2,3-dimethylimidazolium ion, 1-hexyl-3-methylimidazolium ion, 1-(2-hydroxyethyl)-3-methylimidazolium ion, 2,3-dimethyl-1-propylimidazolium ion, 1,3-dimethylimidazolium ion, 1-methyl-3-n-octylimidazolium ion, 1-methyl-3-propylimidazolium ion, 1-methyl-3-pentylimidazolium ion), ammonium ions, amyltriethylammonium ion, butyltrimethylammonium ion, ethyl(2-methoxyethyl)dimethylammonium ion, tetrabutylammonium ion), pyridinium ions, 1-butylpyridinium ion, 1-butyl-4-methylpyridinium ion), pyrrolidinium ions (1-butyl-1-methylpyrrolidinium ions, 1-ethyl-1-methylpyrrolidinium ions, 1-methyl-1-propylpyrrolidinium ions), phosphonium ions, and combinations thereof.

4. The assembly of claim 3, wherein the ionic material includes anions selected from the group consisting of chloride ion, bromide ion, hexafluoroarsenic ion, hexafluorophosphate ion ($PF_6^-$), perchlorate ion, trifluoromethanesulfonic ion ($[CF_3SO_3]^-$), $[N(C_2F_5SO_2)_2]^-$, $[N(C_4F_9SO_2)(CF_3SO_2)]^-$, bis(trifluoromethane)sulfonimide ion ($[N(CF_3SO_2)_2]^-$), bis(oxalato)borate ion ($[B(CO_2)]^-$), tetrafluoroborate ion ($BF_4^-$), bis(fluorosulfonyl)imide ion ($[N(FSO_2)_2]^-$), nitrate ion, hydrogen sulfate ion, $Al_2Cl_7^-$, $Al_3Cl_{10}^-$, $AlCl_4^-$, trifluoroacetate ion, trifluoro(trifluoromethyl)borate ion, thiocyanate ion, dimethyl phosphate ion, and combinations thereof.

5. The assembly of claim 1, wherein the first electrode and the second electrode each comprise an electron-conductive material and a binder material.

6. The assembly of claim 5, wherein the electron-conductive material is selected from the group consisting of carbon black, single-walled carbon nanotubes, multi-walled carbon nanotubes, mesoporous carbon, activated carbon, graphene, polyanilines, poly(pyrrole)s, poly(3,4-ethylenedioxythiophene), poly(p-phenylene sulfide), and combinations thereof.

7. The assembly of claim 6, wherein the binder material is selected from the group consisting of polyvinylidene fluoride (PVDF), polyvinylidene fluoride-trifluoroethylene (PVDF-TrFE), carboxylic methyl cellulose (CMC), thiosiloxanes, polysiloxanes, poly(ethylene glycol) diacrylate, poly(ethylene glycol), poly(ethylene glycol) dimethylacrylate, poly(acrylic acid), polyethylenimine, polyacrylonitrile, carboxyl terminated butadiene-acrylonitrile, polyurethanes, sulfonated polyisoprene, polycarbamates, polycarbonates, zwitterionic polymers, and combinations thereof.

8. The assembly of claim 1, wherein the polymer electrolyte membrane layer further comprises filler.

9. The assembly of claim 8, wherein the filler is selected from the group consisting of silicon oxide, titanium oxide, aluminum oxide, tin oxide, zinc oxide, zirconium oxide, lead zirconate titanate, barium titanate, polyhedral oligomeric silsesquioxane, and combinations thereof.

10. The assembly of claim 1, wherein the polymer matrix is poly(ethylene glycol) diacrylate and wherein the plasticizer is succinonitrile.

11. A composition for a polymer electrolyte membrane, the composition comprising a polymer matrix, a plasticizer, and an ionic material, wherein the polymer matrix is a mixture of thiosiloxane and poly(ethylene glycol) diacrylate, wherein the polymer matrix is present in an amount from 15 wt. % to 60 wt. %, wherein the ionic material is present in an amount from 20 wt. % to 50 wt. %, and wherein the plasticizer is present in an amount of from 10 wt. % to 30 wt. %, with respect to the total composition.

12. A flexoelectric pneumatic tire comprising
an interior wall of the flexoelectric pneumatic tire,
a polymer electrolyte membrane assembly forming a composite layer of the pneumatic tire,
wherein the polymer electrolyte membrane assembly is adhered on the interior wall of the pneumatic tire,
wherein the polymer electrolyte membrane assembly includes a polymer electrolyte membrane layer positioned between a first electrode and a second electrode,
wherein the polymer electrolyte membrane layer is made from a composition including a polymer matrix, a plasticizer, and an ionic material, and
wherein the polymer electrolyte membrane layer has a glass transition temperature of from −40° C. to −80° C.

13. A polymer electrolyte membrane assembly comprising a polymer electrolyte membrane layer positioned between a first electrode and a second electrode, wherein the polymer electrolyte membrane layer is made from a composition including a polymer matrix, a plasticizer, and an ionic material, wherein the polymer electrolyte membrane assembly is adapted to harvest electrical energy upon the polymer electrolyte membrane assembly bending when contacted with a flow of air provided by wind.

14. A method of harvesting electrical energy, comprising steps of
providing a polymer electrolyte membrane assembly coupled with an energy storage device, wherein the polymer electrolyte membrane assembly includes a polymer electrolyte membrane layer positioned between a first electrode and a second electrode, wherein the polymer electrolyte membrane is made from a polymer matrix, a plasticizer, and an ionic material, wherein the first electrode and the second electrode are each made from a conductive material and a binder material, wherein the polymer electrolyte membrane assembly has an open circuit voltage having an initial ion concentration gradient,
allowing the polymer electrolyte membrane assembly to bend to thereby produce a second ion concentration gradient different from the initial ion concentration gradient, and
collecting, with the energy storage device, electrical energy formed by the second ion concentration gradient.

15. The method of claim 14, wherein the energy storage device is a battery, which performs said step of collecting.

16. A method of electrical actuation, comprising steps of
providing a polymer electrolyte membrane assembly coupled with an electrical energy source, wherein the polymer electrolyte membrane assembly includes a polymer electrolyte membrane layer positioned between a first electrode and a second electrode, wherein the polymer electrolyte membrane is made from a polymer matrix, a plasticizer, and an ionic material, wherein the first electrode and the second electrode are each made from a conductive material and a binder material, wherein the polymer electrolyte membrane assembly has an open circuit voltage having an initial ion concentration gradient, and
applying, with the electrical energy source, electrical energy to the polymer electrolyte membrane assembly such that the polymer electrolyte membrane assembly changes to a second ion concentration gradient to thereby act as an electrical actuator.

17. The method of claim 16, wherein the electrical energy source is a DC voltage supplier, which performs said step of applying.

18. The method of claim 13, wherein the polymer electrolyte membrane layer has a specific conductivity ($\sigma$) within the range of $10^{-3}$ S/cm to 10 S/cm at room temperature.

* * * * *